(12) United States Patent
Scaroni et al.

(10) Patent No.: US 12,091,113 B1
(45) Date of Patent: Sep. 17, 2024

(54) TRAILERING SYSTEM

(71) Applicant: Valley Harvesting and Packing Inc., Heber, CA (US)

(72) Inventors: Steve Scaroni, El Centro, CA (US); Matt Scaroni, El Centro, CA (US); David Scaroni, Salinas, CA (US)

(73) Assignee: Valley Harvesting and Packing Inc., Heber, CA (US)

( * ) Notice: Subject to any disclaimer, the term of this patent is extended or adjusted under 35 U.S.C. 154(b) by 0 days.

(21) Appl. No.: 18/384,309

(22) Filed: Oct. 26, 2023

(51) Int. Cl.
*B62D 53/06* (2006.01)
*B62D 21/20* (2006.01)
*B62D 63/08* (2006.01)

(52) U.S. Cl.
CPC ............. *B62D 63/08* (2013.01); *B62D 21/20* (2013.01); *B62D 53/061* (2013.01)

(58) Field of Classification Search
CPC ...... B62D 21/20; B62D 53/061; B62D 21/04; B62D 21/09; B62D 21/11; B62D 63/08
See application file for complete search history.

(56) References Cited

U.S. PATENT DOCUMENTS 10,094,703 B2 * 10/2018 Dyal ..................... G01G 19/08

FOREIGN PATENT DOCUMENTS

FR 3052135 A1 * 12/2017

* cited by examiner

*Primary Examiner* — Faye M Fleming
(74) *Attorney, Agent, or Firm* — Kali Law Group, P. C.

(57) ABSTRACT

Trailering systems are presenting including: a semi-truck trailer; a base positioned along a top surface the semi-truck trailer, where the top surface receives lower cargo, the base including, a pair of forward posts; a forward post mounting rail; a pair of aft posts, a pair of aft posts; an aft post mounting; and an upper deck slidingly engaged with the base, the upper deck including, a pair of forward slides; a pair of aft slides; a pair of side rails; an aft slide mounting rail; a decking; and an airbag system including; a number of forward airbags; a number of aft; and at least one control valve for inflating and deflating the number of forward airbags and the number of aft airbags.

11 Claims, 7 Drawing Sheets

TRAILERING SYSTEM

BACKGROUND

In an economic reality where cost of labor and materials is perpetually increasing, more efficient utilization of available cube space of loads is becoming more desirable. It is relatively simple to arrange a single layer of bins/containers to be hauled from an origin pickup to destination drop on a semi-truck flatbed trailer. Often single layer hauling is required where containers are not easily stacked directly on top of each other such as with fiber or corrugated containers. In addition, open containers utilized in agricultural operations may be overfilled further prohibiting stacking containers over a single layer. Even so, the addition of a second deck would be more economically efficient as higher numbers of containers could be transported on a single trailer. A trailering system that provides stacked layers of otherwise non-stackable bin/container loads would lower costs and increase productivity.

In addition, conventional lifting systems utilize hydraulic lift mechanisms, which have been utilized extensively in the transportation industry. However, where agricultural goods are concerned, hydraulic systems risk contamination of edible produce because of the use of hydraulic oils. Furthermore, hydraulic systems add complexity as an independent hydraulic system requiring high pressure must be utilized.

As such trailering systems are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, trailering systems are presenting including: a semi-truck trailer; a base positioned along a top surface the semi-truck trailer, where the top surface receives lower cargo, the base including, a pair of forward posts positioned along a forward portion of the semi-truck trailer and substantially perpendicular with the semi-truck trailer, where the pair of forward posts are substantially parallel to one another; a forward post mounting rail mechanically coupled with and substantially perpendicular to the forward posts along a forward post mid-portion; a forward post top rail mechanically coupled with and substantially perpendicular to the pair of forward posts along a forward post top portion; a pair of aft posts positioned along an aft portion of the semi-truck trailer and substantially perpendicular with the semi-truck trailer, where the pair of aft posts are substantially parallel to one another, and where the pair of forward posts are substantially parallel with the pair of aft posts; an aft post mounting rail mechanically coupled with and substantially perpendicular to the aft posts along an aft post mid-portion; an aft post top rail mechanically coupled with and substantially perpendicular to the pair of aft posts along an aft post top portion; and an upper deck slidingly engaged with the base, the upper deck including, a pair of forward slides that capture the pair of forward posts, where the pair of forward slides are substantially parallel to one another; a pair of aft slides that capture the pair of aft posts, where the pair of aft slides are substantially parallel to one another, and where the pair of forward slides are substantially parallel with the pair of aft slides; a pair of side rails each coupled with one of the forward slides and one of the aft slides; a forward slide mounting rail mechanically coupled with and substantially perpendicular to the forward slides; an aft slide mounting rail mechanically coupled with and substantially perpendicular to the aft slides; a decking defined by and coupled with the side rails and the forward and aft slide mounting rails for receiving upper cargo; and an airbag system including; a number of forward airbags each mounted along the forward post mounting rail and the forward slide mounting rail; a number of aft airbags each mounted along the aft post mounting rail and the aft slide mounting rail; and at least one control valve for inflating and deflating the number of forward airbags and the number of aft airbags.

In some embodiments, systems further include: a pair of forward upper deck stops positioned along the forward post mounting rail; and a pair of aft upper deck stops positioned along the aft post mounting rail, where the upper deck stops limit the downward movement of the upper deck. In some embodiments, systems further include: an air supply for inflating the number of forward airbags and the number of aft airbags. In some embodiments, the air supply is: a towing vehicle onboard air supply and an independent air supply. In some embodiments, the pair of forward slides further include a number of polymeric slide plates disposed along inside surfaces of each of the pair of forward slides. In some embodiments, the pair of aft slides further include a number of polymeric slide plates disposed along inside surfaces of each of the pair of aft slides.

In other embodiments, methods of loading a trailering system are presented including: providing the trailering system; lowering the upper deck; loading the upper cargo along the upper cargo; raising the upper deck; loading the lower cargo along the top surface; and lowering the upper deck. In some embodiments, methods further include: raising the upper deck; unloading the lower cargo; lowering the upper deck; and unloading the upper cargo.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about." "approximately," or "substantially" for any numerical values or ranges indicate a suitable dimensional tolerance that allows the part or collection of components to function for its intended purpose as described herein.

Figure 1:
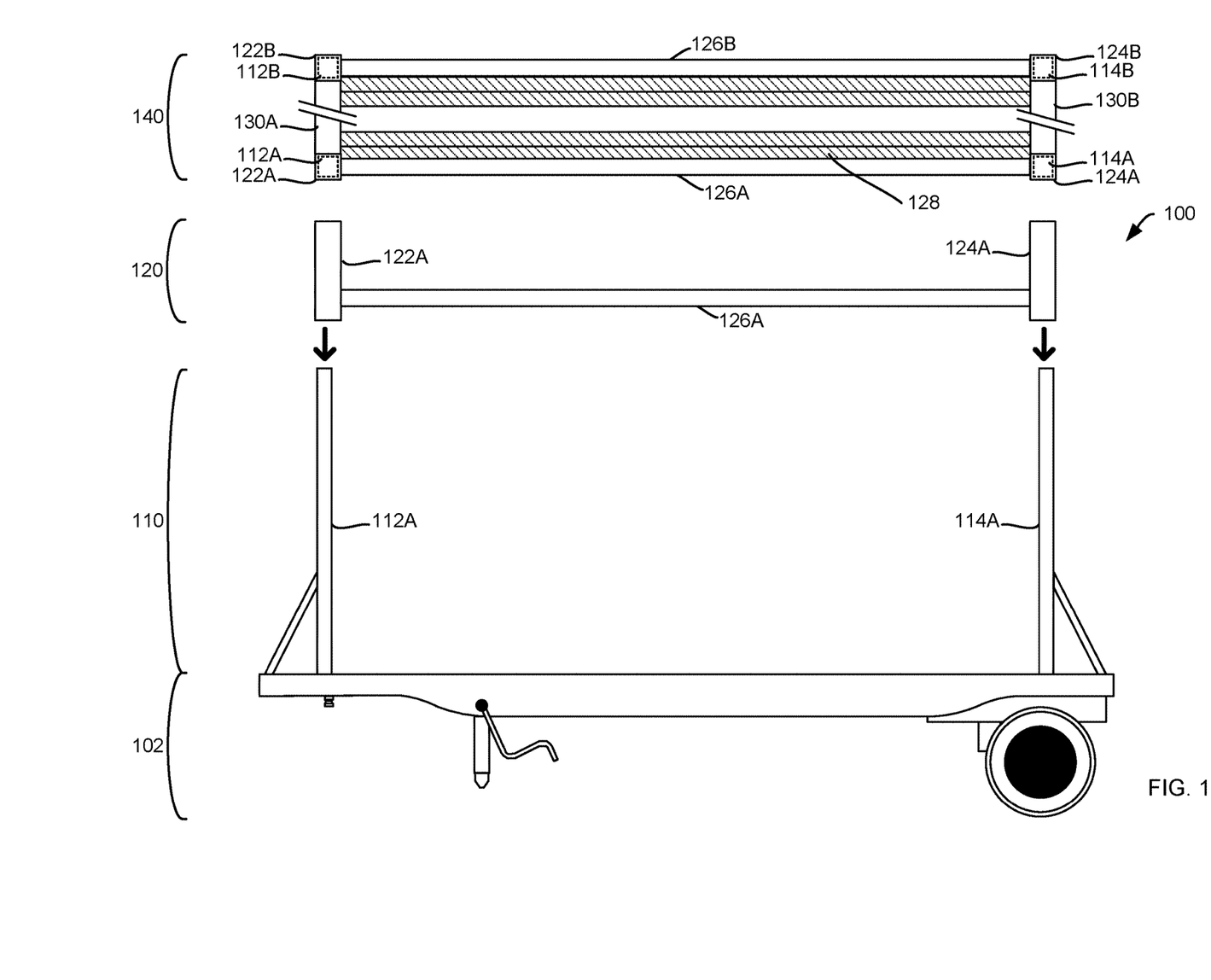
FIG. 1 is an illustrative representation of a trailer system in exploded view in accordance with embodiments of the present invention.

FIG. 1 is an illustrative representation of trailer system 100 in exploded view in accordance with embodiments of the present invention. As illustrated, semi-truck trailer 102 may be utilized as a platform for embodiments disclosed herein. In embodiments, semi-truck trailers may include: flatbed trailers, drop deck trailers, expandable drop deck trailers, detachable double drop trailers, and lowboy trailers without limitation. One skilled in the art will recognize that any variety of trailers or platforms may be utilized in embodiments disclosed herein without limitation. Further illustrated are base 110 and upper deck 120. Base 110 provides a framework and support structure for the vertical movement of upper deck 120 in embodiments. Base 110 includes forward posts 112A and 112B that are positioned along a forward portion of semi-truck trailer 100 and are substantially perpendicular thereto. In addition, forward posts are substantially parallel to one another. Further illustrated are aft posts 114A and 114B that are positioned along an aft portion of semi-truck trailer 100 and are substantially perpendicular thereto. In addition, aft posts are substantially parallel to one another.

Further illustrated is upper deck 120, which may be slidingly engaged with base 110. Upper deck 120 includes forward slides 122A and 122B that capture forward posts 112A and 112B. In addition, forward slides 122A and 122B are substantially parallel to one another. Upper deck 120 further includes aft slides 124A and 124B that capture aft posts 114A and 114B. In addition, aft slides 124A and 124B are substantially parallel to one another and with forward slides 122A and 122B. The slides are mechanically coupled with side rails 126A and 126B. Upper deck 110 further includes forward slide mounting rail 130A which is mechanically coupled with and substantially perpendicular to the forward slides and aft slide as well as mounting rail 130B which is mechanically coupled with and substantially perpendicular to the aft slides (see Plan View 140 of upper deck 120). Mounting rails will be discussed in further detail below for FIG. 3. In operation, the upper deck moves vertically in relation to the semi-truck trailer to facilitate loading. In some embodiments, the forward and aft slides include slide plates along the inside surface of the slides. In some embodiments, the slide plate is manufactured from a polymeric material such as high-density polyethylene (HDPE). Upper deck 110 further includes decking 128, which is defined by and coupled with the side rails and mounting rails for receiving upper cargo.

Figure 2:
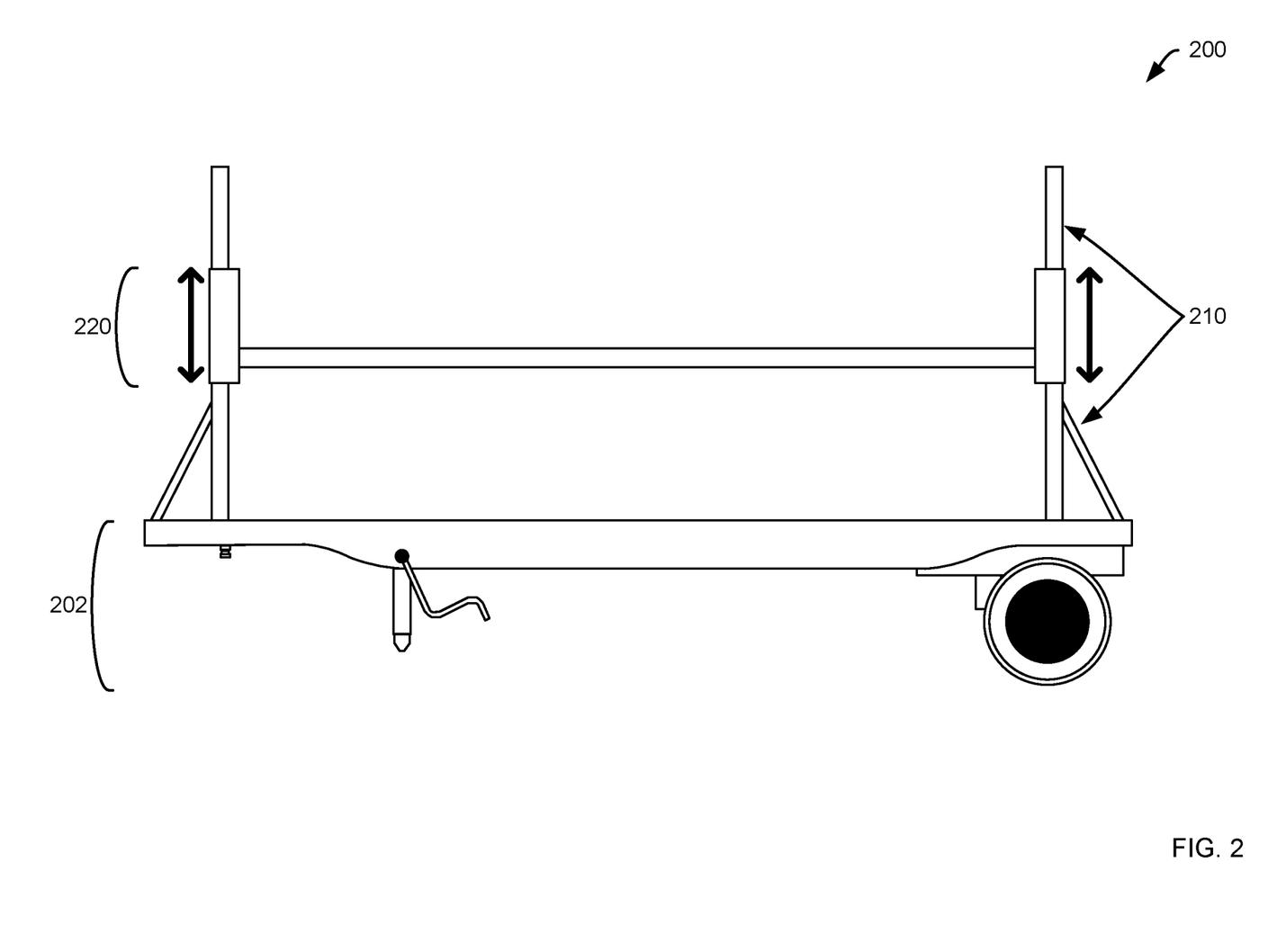
FIG. 2 is an illustrative representation of a trailer system in accordance with embodiments of the present invention.

FIG. 2 is an illustrative representation of trailer system 200 in accordance with embodiments of the present invention. In particular, FIG. 2 illustrates a fully unloaded trailer system. As illustrated, semi-truck trailer 202 may be utilized as a platform for embodiments disclosed herein. In embodiments, semi-truck trailers may include: flatbed trailers, drop deck trailers, expandable drop deck trailers, detachable double drop trailers, and lowboy trailers without limitation. One skilled in the art will recognize that any variety of trailers or platforms may be utilized in embodiments disclosed herein. Further illustrated is base 210 and upper deck 220, which is configured to move vertically with respect to base 210 to accommodate loading.

Figure 3:
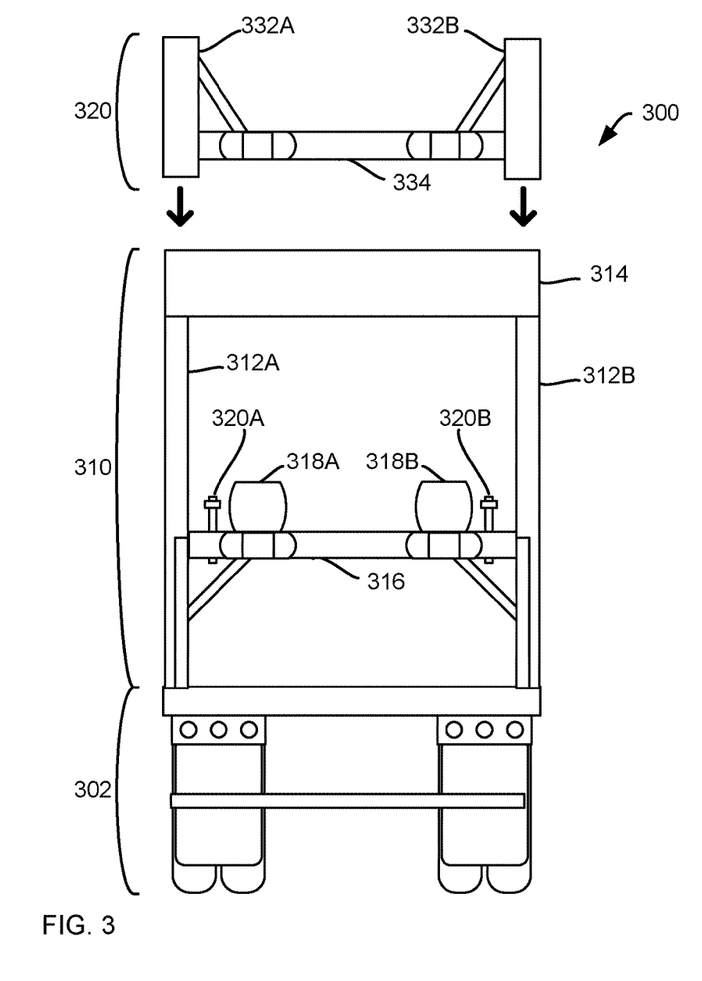
FIG. 3 is an illustrative representation of a trailer system in exploded view in accordance with embodiments of the present invention.

FIG. 3 is an illustrative representation of trailer system 300 in exploded view in accordance with embodiments of the present invention. As illustrated, semi-truck trailer 302 may be utilized as a platform for embodiments disclosed herein. In embodiments, semi-truck trailers may include: flatbed trailers, drop deck trailers, expandable drop deck trailers, detachable double drop trailers, and lowboy trailers without limitation. One skilled in the art will recognize that any variety of trailers or platforms may be utilized in embodiments disclosed herein. Further illustrated are base 310 and upper deck 320. Base 310 provides a framework and structural support for the vertical movement of upper deck 320 in embodiments. Base 310 includes aft posts 312A and 312B that are positioned along an aft portion of semi-truck trailer 302 and are substantially perpendicular thereto. In addition, aft posts are substantially parallel to one another. Further illustrated, aft post top rail 314 that is mechanically coupled with and substantially perpendicular to aft posts 312A and 312B along an aft post top portion. In addition, aft post mounting rail 316 is mechanically coupled with and substantially perpendicular to aft posts 312A and 312B along an aft post mid-portion. In the illustrated figure, two (or more) aft air bags 318A and 318B may be mounted along aft post mounting rail 316. Further illustrated are aft upper deck stops 320A and 320B for limiting the downward movement of the upper deck. The presented figure illustrates a trailer system embodiment from the rear view. Forward structures are similarly configured, but not shown here. That is, base embodiments include forward posts that are positioned along a forward portion of a semi-truck trailer and are substantially perpendicular thereto. In addition, forward posts are substantially parallel to one another. Forward post top rail embodiments are mechanically coupled with and substantially perpendicular to forward posts along a forward post top portion. In addition, a forward post mounting rail is mechanically coupled with and substantially perpendicular to forward posts along a forward post mid-portion. Likewise, two (or more) forward air bags and forward upper deck stops may be mounted along a forward post mounting rail.

Further illustrated is upper deck 320, which may be slidingly engaged with base 310. Upper deck 320 includes aft slides 332A and 332B that capture aft posts 312A and 312B. In addition, aft slides 332A and 332B are substantially parallel to one another and with forward slides (see FIG. 1, 122A and 112B). The aft slides are mechanically coupled with side rails (see FIG. 1, 126A and 126B). Upper deck 310 further includes aft slide mounting rail 334 which is mechanically coupled with and substantially perpendicular to aft slides 332A and 332B. In the illustrated figure, two (or more) aft air bags 318A and 318B may be mounted along aft slide mounting rail 334. The presented figure illustrates a trailer system embodiment from the rear view. Forward structures are similarly configured, but not shown here. That is, upper deck embodiments include forward slides that capture forward posts. In addition, forward slides are substantially parallel to one another and with aft slides. Forward slides embodiments are mechanically coupled with side rails (see FIG. 1, 126A and 126B). Upper deck embodiments further include a forward slide mounting rail which is mechanically coupled with and substantially perpendicular to forward slides. Likewise, two (or more) forward air bags may be mounted along forward slide mounting rail 334. In operation, the upper deck moves vertically in relation to the semi-truck trailer to facilitate loading. In some embodiments, the forward and aft slides include slide plates along the inside surfaces of the slides. In some embodiments, the slide plate is manufactured from a polymeric material such as high-density polyethylene (HDPE).

Figure 4:
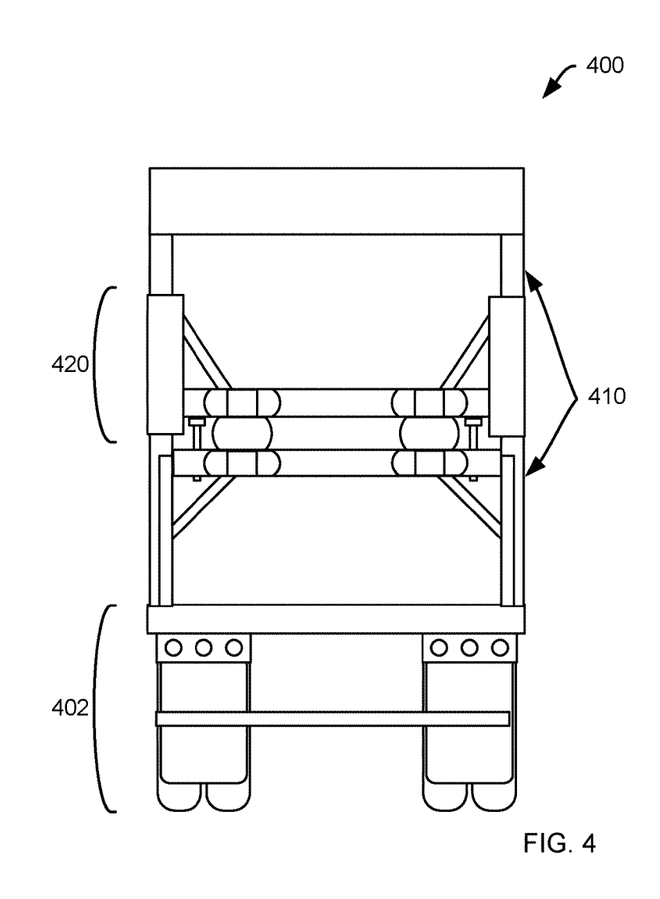
FIG. 4 is an illustrative representation of a trailer system in accordance with embodiments of the present invention.

FIG. 4 is an illustrative representation of trailer system 400 in accordance with embodiments of the present invention. In particular, FIG. 4 illustrates a fully unloaded trailer system. As illustrated, semi-truck trailer 402 may be utilized as a platform for embodiments disclosed herein. In embodiments, semi-truck trailers may include: flatbed trailers, drop deck trailers, expandable drop deck trailers, detachable double drop trailers, and lowboy trailers without limitation. One skilled in the art will recognize that any variety of trailers or platforms may be utilized in embodiments disclosed herein. Further illustrated is base 410 and upper deck 420, which is configured to move vertically with respect to base 410 to accommodate loading.

Process: Load/Unload

Figure 5:
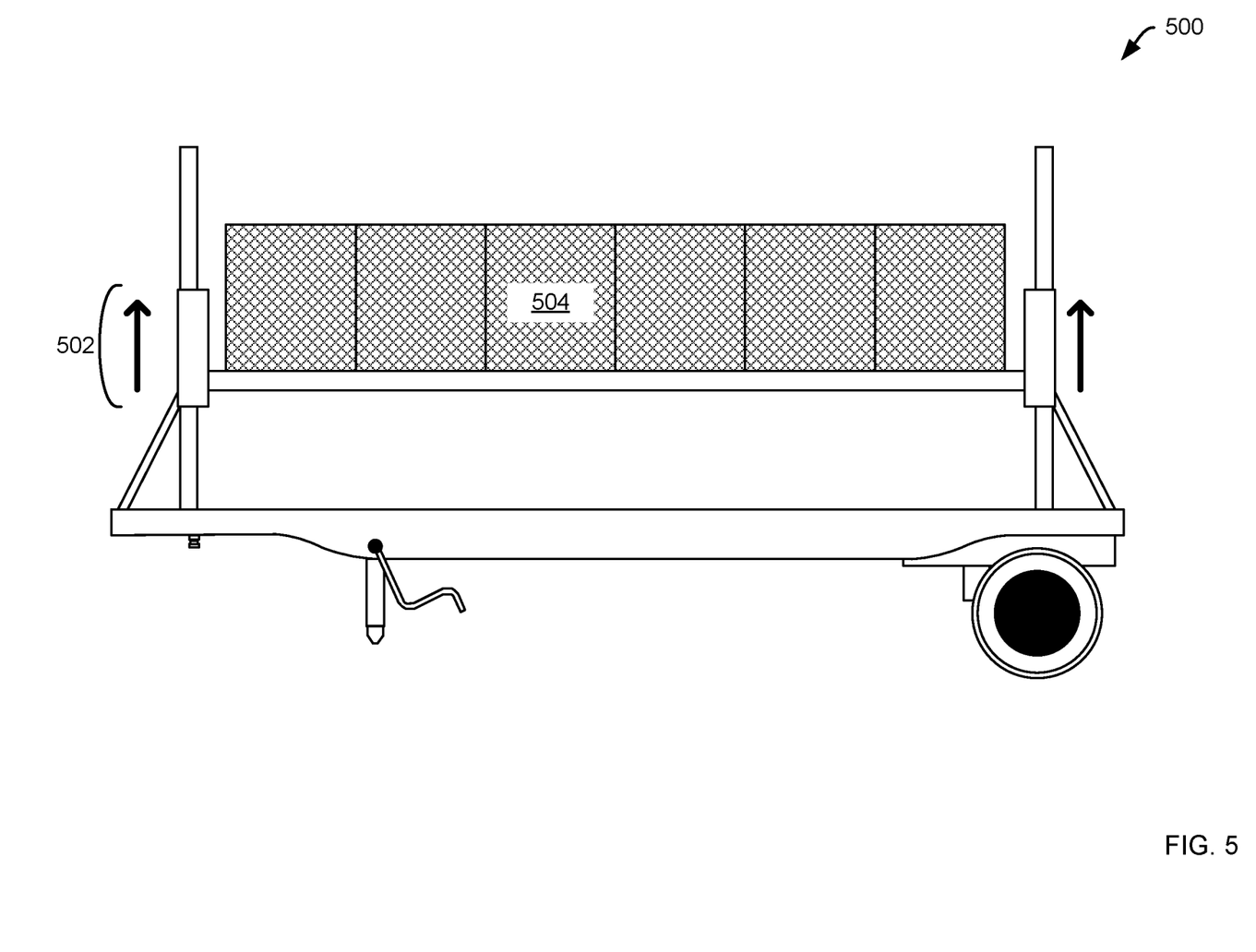
FIG. 5 is an illustrative representation of a trailer system partially loaded in accordance with embodiments of the present invention.

FIG. 5 is an illustrative representation of trailer system 500 partially loaded in accordance with embodiments of the present invention. In particular, FIG. 5 illustrates upper load 504 on lowered upper deck 502. Lowering the upper deck allows a convenient reach for smaller loading devices like forklifts. Lowering the upper deck is accomplished by releasing air from the airbags. Once the upper deck is loaded, the upper deck may be raised by filling the airbags with air as indicated by the upward arrows illustrated. The upper deck is raised to allow loading of the lower load on the semi-truck tractor.

Figure 6:
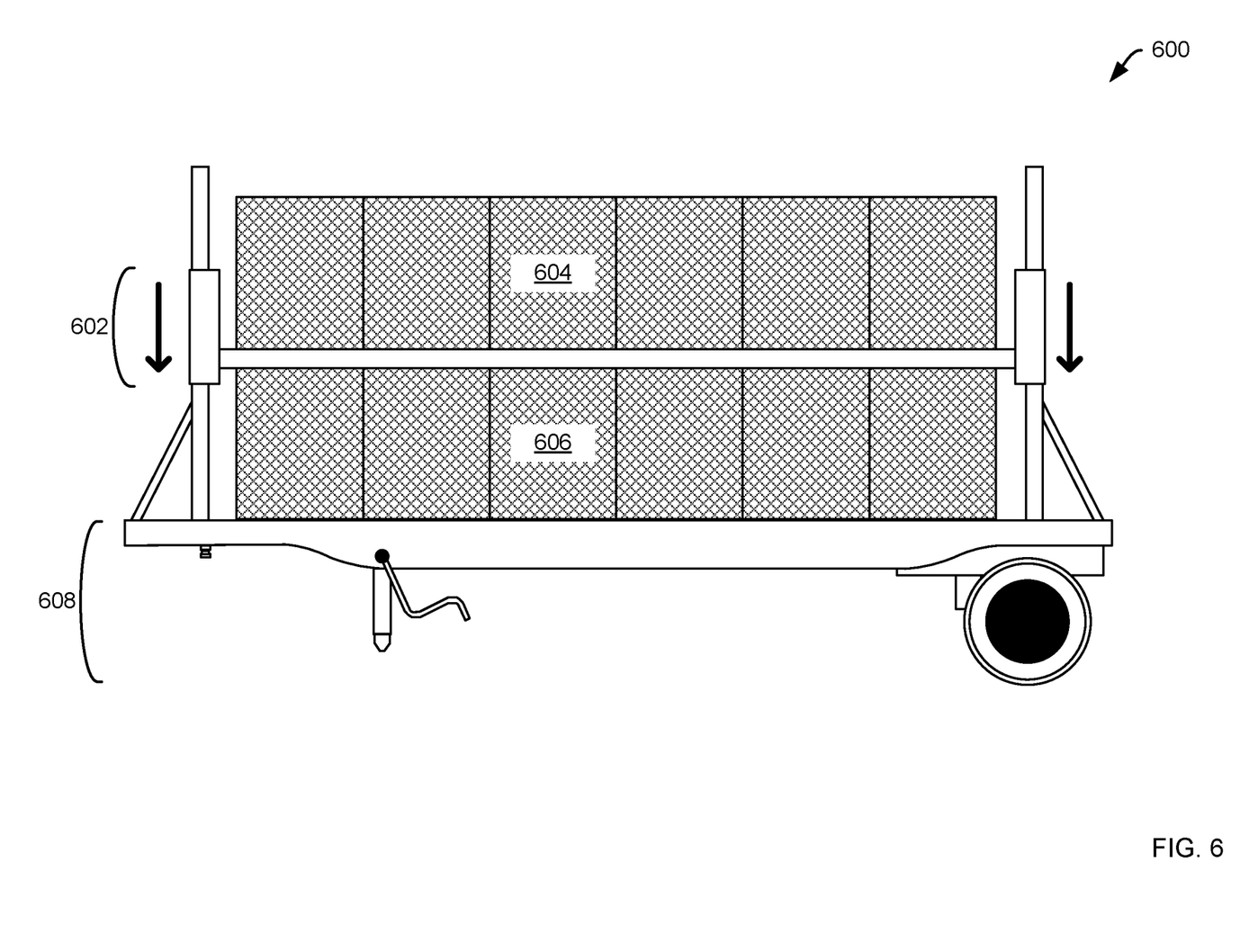
FIG. 6 is an illustrative representation of a trailer system fully loaded in accordance with embodiments of the present invention.

FIG. 6 is an illustrative representation of a trailer system 600 fully loaded in accordance with embodiments of the present invention. In particular, FIG. 6 illustrates upper load 604 on upper deck 602 and lower load 606 on semi-truck trailer 608. Raising the upper deck is accomplished by filling airbags with air. Once the lower load is loaded, the upper deck may be lowered by releasing air from the airbags as indicated by the downward arrows illustrated. Once the upper deck is lowered, the load is ready for transport. Unloading is the reverse of the illustrated processes of FIGS. 5 and 6.

Figures 7, 8:
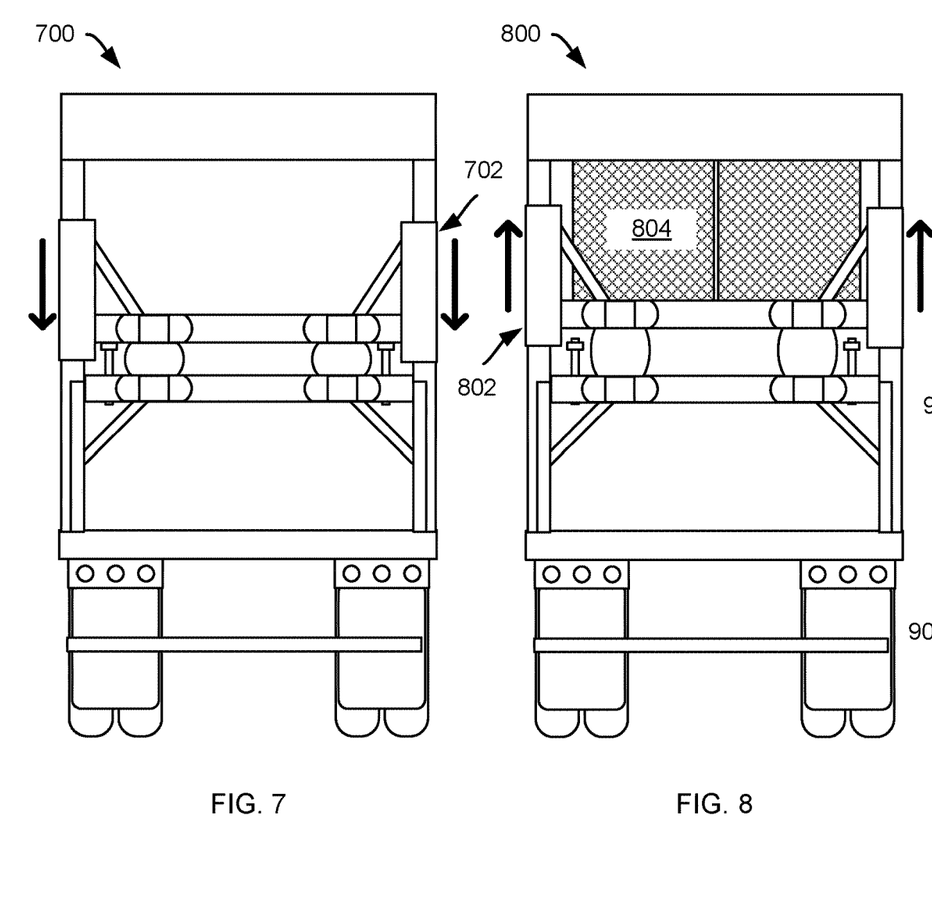
FIG. 7 is an illustrative representation of a trailer system unloaded in accordance with embodiments of the present invention.
FIG. 8 is an illustrative representation of a trailer system partially loaded in accordance with embodiments of the present invention.

FIG. 7 is an illustrative representation of unloaded trailer system 700 in accordance with embodiments of the present invention. In particular, FIG. 7 illustrates unloaded trailer system 700 with the upper deck 702 lowered. Lowering the upper deck allows a convenient reach for smaller loading devices like forklifts. Lowering the upper deck is accomplished by releasing air from the airbags as indicated by the downward arrows illustrated.

FIG. 8 is an illustrative representation of trailer system 800 partially loaded in accordance with embodiments of the present invention. In particular, FIG. 8 illustrates upper load 804 on raised upper deck 802. Once upper deck 802 is loaded, the upper deck may be raised by filling the airbags with air as indicated by the upward arrows illustrated. The upper deck is raised to allow loading of the lower load on the semi-truck tractor.

Figure 9:
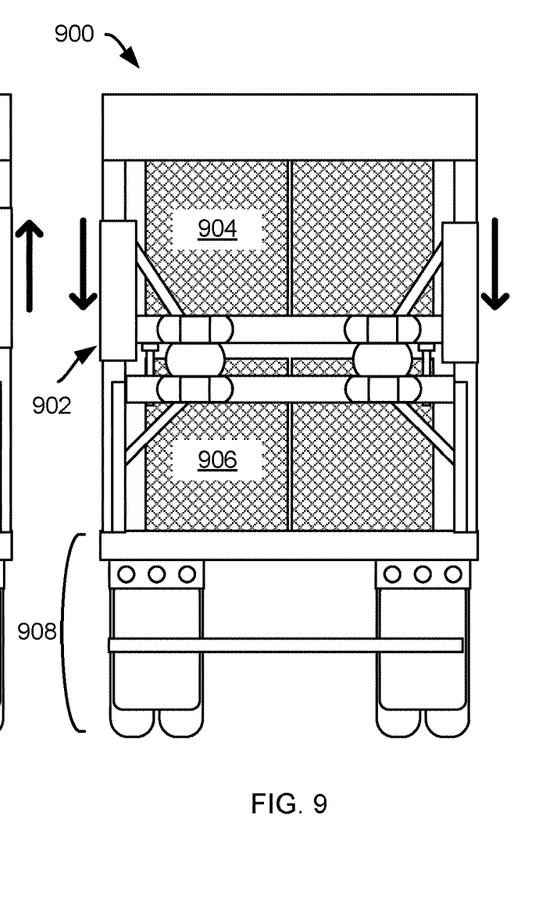
FIG. 9 is an illustrative representation of a trailer system fully loaded in accordance with embodiments of the present invention.

FIG. 9 is an illustrative representation of a trailer system 900 fully loaded in accordance with embodiments of the present invention. In particular, FIG. 9 illustrates upper load 904 on upper deck 902 and lower load 906 on semi-truck trailer 908. Once lower load 906 is loaded, upper deck 902 may be lowered by releasing air from the airbags as indicated by the downward arrows illustrated. Once the upper deck is lowered, the load is ready for transport. Unloading is the reverse of the illustrated processes of FIGS. 7, 8, and 9.

Figure 10:
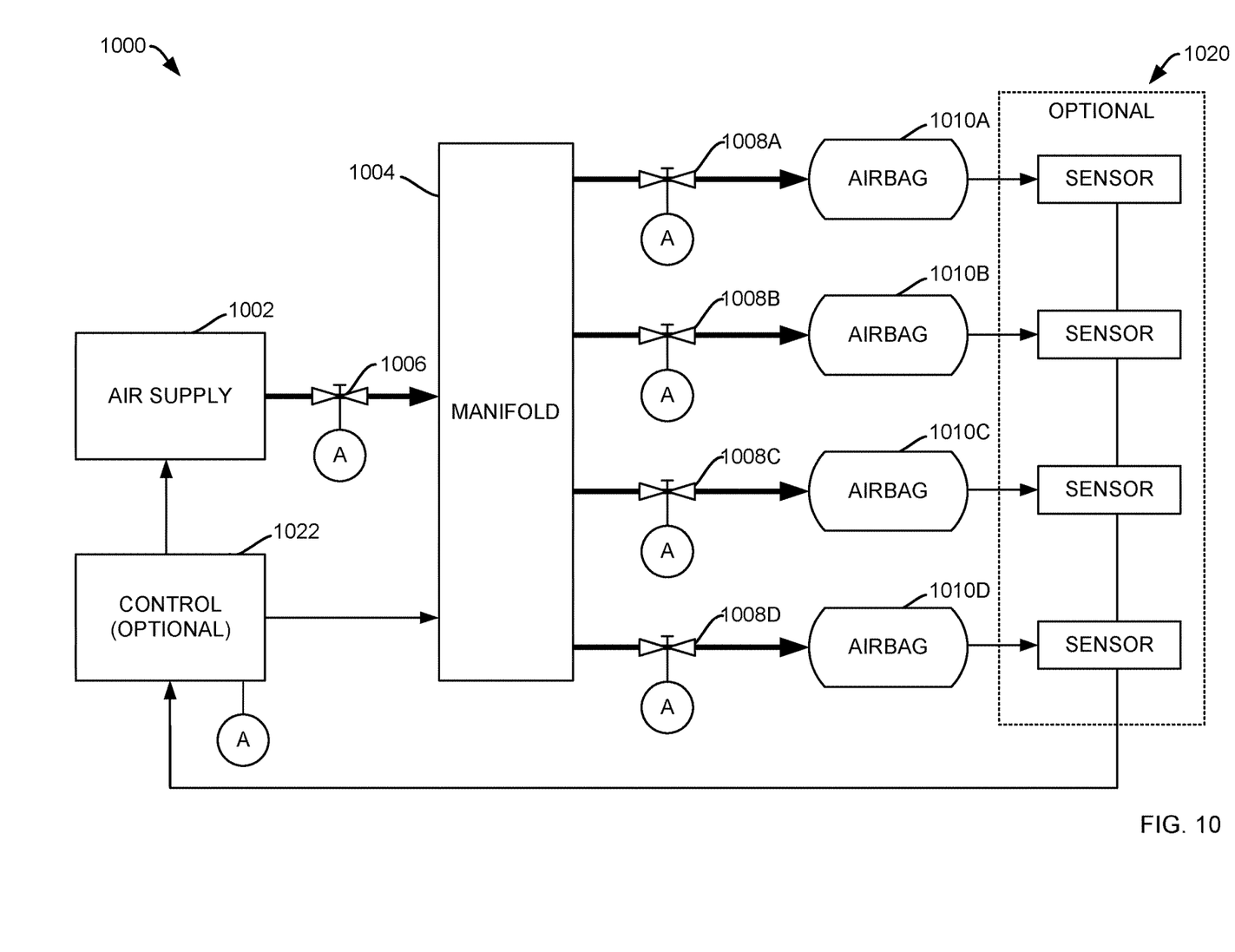
FIG. 10 is an illustrative representation of an air system for use with a trailer system in accordance with embodiments of the present invention.

FIG. 10 is an illustrative representation of air system 1000 for use with a trailer system in accordance with embodiments of the present invention. As illustrated, air system 1000 includes air supply 1002 for inflating the airbags. As is well known in the art, modern commercial vehicles over 26,000 lbs. gross vehicle weight rating (GVWR) have a built-in air system that offers a constant air supply to the trailers that the commercial vehicle is pulling. Air is a much cleaner, lower maintenance, and simpler energy source in comparison to electric or hydraulic energy sources. In some older systems, a separate compressor may be utilized. As such, in embodiments, the air supply may be a towing vehicle onboard air supply or an independent air supply without limitation. Furthermore, in some embodiments, air supplies require a storage tank (not shown) to avoid a constant duty cycle. In some embodiments, master valve 1006 may be hand actuated to inflate and deflate all airbags 1010A-1010D simultaneously via manifold 1004 that distributes the air supply. In other embodiments, individual valves 1008A-1008D may be hand actuated to inflate and deflate each individual airbags 1010A-1010D. It may be appreciated that when a bind occurs during operation, the ability to individually inflate and deflate each airbag may be useful. In some embodiments, an optional remote control system including sensors 1020 and control circuits 1022 may be utilized. Sensors such as air pressure sensors or position sensors may be utilized to determine the level of inflation of each airbag, whereupon the control circuitry may actuate a corresponding valve collectively or individually.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A trailering system comprising:
   a semi-truck trailer;
   a base positioned along a top surface the semi-truck trailer, wherein the top surface receives lower cargo, the base comprising,
   a pair of forward posts positioned along a forward portion of the semi-truck trailer and substantially perpendicular with the semi-truck trailer, wherein the pair of forward posts are substantially parallel to one another;
   a forward post mounting rail mechanically coupled with and substantially perpendicular to the forward posts along a forward post mid-portion;
   a forward post top rail mechanically coupled with and substantially perpendicular to the pair of forward posts along a forward post top portion;
   a pair of aft posts positioned along an aft portion of the semi-truck trailer and substantially perpendicular with the semi-truck trailer, wherein the pair of aft posts are substantially parallel to one another, and wherein the pair of forward posts are substantially parallel with the pair of aft posts;
   an aft post mounting rail mechanically coupled with and substantially perpendicular to the aft posts along an aft post mid-portion; and
   an aft post top rail mechanically coupled with and substantially perpendicular to the pair of aft posts along an aft post top portion;
   an upper deck slidingly engaged with the base, the upper deck comprising,
   a pair of forward slides that capture the pair of forward posts, wherein the pair of forward slides are substantially parallel to one another;
   a pair of aft slides that capture the pair of aft posts, wherein the pair of aft slides are substantially parallel to one another, and wherein the pair of forward slides are substantially parallel with the pair of aft slides;
   a pair of side rails each coupled with one of the forward slides and one of the aft slides;
   a forward slide mounting rail mechanically coupled with and substantially perpendicular to the forward slides;
   an aft slide mounting rail mechanically coupled with and substantially perpendicular to the aft slides; and
   a decking defined by and coupled with the side rails and the forward and aft slide mounting rails for receiving upper cargo; and
   an airbag system comprising;
   a plurality of forward airbags each mounted along the forward post mounting rail and the forward slide mounting rail;
   a plurality of aft airbags each mounted along the aft post mounting rail and the aft slide mounting rail; and
   at least one control valve for inflating and deflating the plurality of forward airbags and the plurality of aft airbags.

2. The trailering system of claim 1, further comprising:
   a pair of forward upper deck stops positioned along the forward post mounting rail; and
   a pair of aft upper deck stops positioned along the aft post mounting rail, wherein the upper deck stops limit the downward movement of the upper deck.

3. The trailering system of claim 1, further comprising:
   an air supply for inflating the plurality of forward airbags and the plurality of aft airbags.

4. The trailering system of claim 3, wherein the air supply is selected from the group consisting of: a towing vehicle onboard air supply and an independent air supply.

5. The trailering system of claim 3 further comprising an air storage tank.

6. The trailering system of claim 3, wherein the airbag system further comprises:
   a manifold for distributing the air supply.

7. The trailering system of claim 1, wherein the pair of forward slides further comprise a plurality of polymeric slide plates disposed along inside surfaces of each of the pair of forward slides.

8. The trailering system of claim 1, wherein the pair of aft slides further comprise a plurality of polymeric slide plates disposed along inside surfaces of each of the pair of aft slides.

9. The trailering system of claim 1, wherein the semi-truck trailer is selected from the group consisting of: a flatbed trailer, a drop deck trailer, an expandable drop deck trailer, a detachable double drop trailer, and a lowboy trailer.

10. A method of loading a trailering system comprising:
    providing the trailering system, the trailering system comprising:
    a semi-truck trailer;
    a base positioned along a top surface of the semi-truck trailer wherein the top surface receives lower cargo, the base comprising,
    a pair of forward posts positioned along a forward portion of the semi-truck trailer and substantially perpendicular with the semi-truck trailer, wherein the pair of forward posts are substantially parallel to one another;
    a forward post mounting rail mechanically coupled with and substantially perpendicular to the forward posts along a forward post mid-portion;
    a forward post top rail mechanically coupled with and substantially perpendicular to the pair of forward posts along a forward post top portion;
    a pair of aft posts positioned along an aft portion of the semi-truck trailer and substantially perpendicular with the semi-truck trailer, wherein the pair of aft posts are substantially parallel to one another, and wherein the pair of forward posts are substantially parallel with the pair of aft posts;

an aft post mounting rail mechanically coupled with and substantially perpendicular to the aft posts along an aft post mid-portion; and an aft post top rail mechanically coupled with and substantially perpendicular to the pair of aft posts along an aft post top portion;

an upper deck slidingly engaged with the base, the upper deck comprising, a pair of forward slides that capture the pair of forward posts, wherein the pair of forward slides are substantially parallel to one another;

a pair of aft slides that capture the pair of aft posts, wherein the pair of aft slides are substantially parallel to one another, and wherein the pair of forward slides are substantially parallel with the pair of aft slides;

a pair of side rails each coupled with one of the forward slides and one of the aft slides;

a forward slide mounting rail mechanically coupled with and substantially perpendicular to the forward slides;

an aft slide mounting rail mechanically coupled with and substantially perpendicular to the aft slides; and a decking defined by and coupled with the side rails and the forward and aft slide mounting rails for receiving upper cargo; and an airbag system comprising;

a plurality of forward airbags each mounted along the forward post mounting rail and the forward slide mounting rail;

a plurality of aft airbags each mounted along the aft post mounting rail and the aft slide mounting rail; and at least one control valve for inflating and deflating the plurality of forward airbags and the plurality of aft airbags;

lowering the upper deck;

loading the upper cargo along the upper cargo;

raising the upper deck;

loading the lower cargo along the top surface; and lowering the upper deck.

11. The method of claim 10, further comprising:

raising the upper deck;

unloading the lower cargo;

lowering the upper deck; and unloading the upper cargo.

* * * * *